Inventor
G. A. DAIGLE

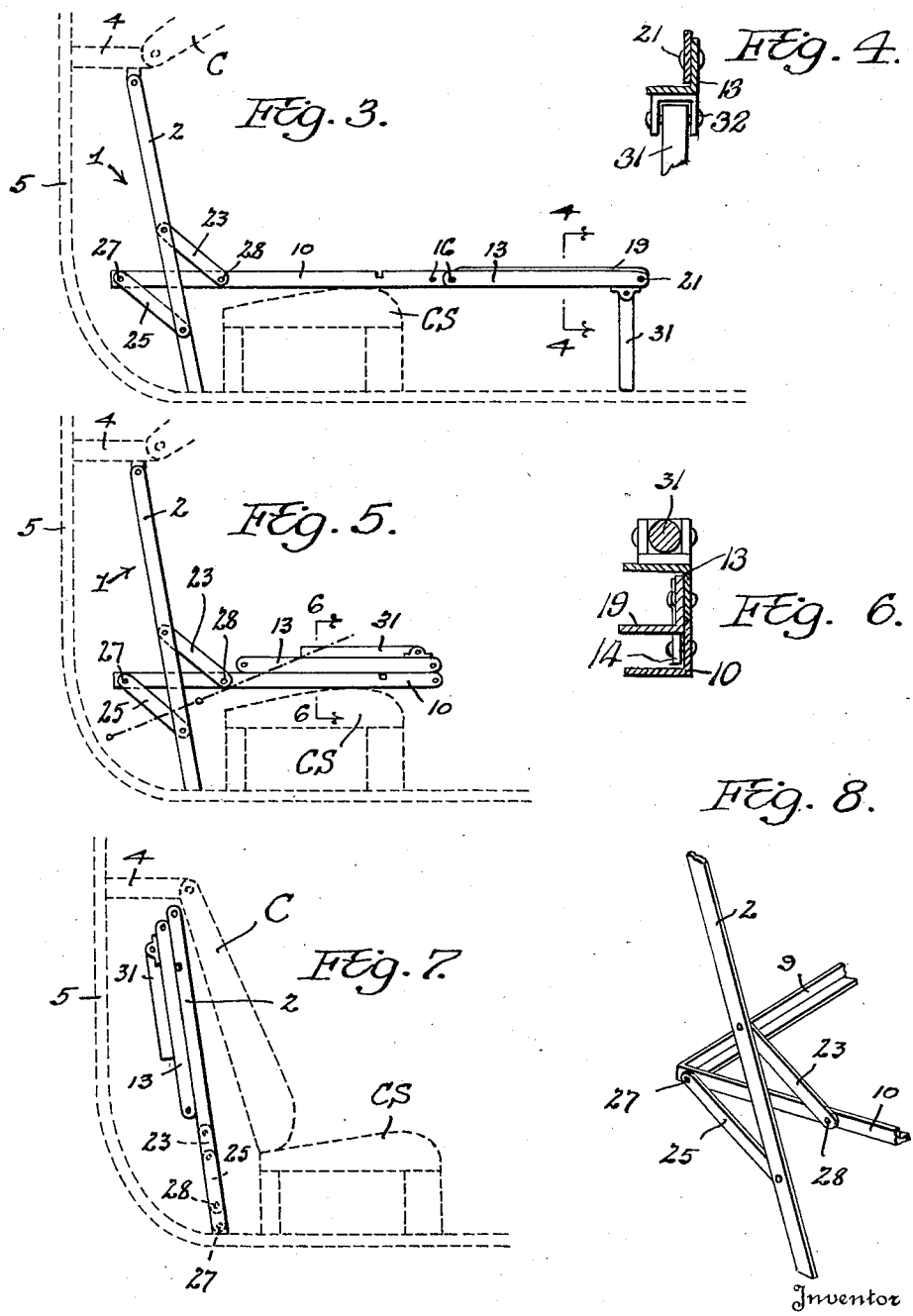

Patented Aug. 9, 1932

1,871,158

UNITED STATES PATENT OFFICE

GILLIS A. DAIGLE, OF PORT ARTHUR, TEXAS

FOLDING BED

Application filed September 12, 1931. Serial No. 562,573.

This invention relates to folding beds of a type adapted for use in automobiles or in dwellings where space is limited; and particularly relates to that type of folding bed in which the mattress is adapted to be folded along with the springs and frame work of the bed into a compact space.

The main object of the invention is to provide a bed of this character having the parts so designed and assembled that, when folded, one end of the bed will be close to the floor of the automobile or apartment in order to economize space in the vertical as well as horizontal direction.

Another object of the invention is to provide a bed which can be folded and concealed compactly behind the back cushions of an automobile, in space that is ordinarily wasted.

Other objects of the invention will become apparent as the description thereof proceeds.

In the drawings:

Figure 3 is a side elevation of the bed illustrated in Figure 1 but having one part thereof folded;

Figure 4 is a vertical transverse section taken through part of the frame work along the line 4—4 of Figure 3;

Figure 5 is a side elevation of the folding bed illustrating two of the parts folded over a third part and in the last stage of the folding prior to being moved into concealed position;

Figure 6 is a vertical transverse section taken on the line 6—6 of Figure 5;

Figure 7 is a side elevation of the bed completely folded in the space behind the back cushion of the brougham; and Figure 8 is a perspective view of a swinging frame which supports the entire bed when in folded position, and which supports the rear end of the bed when opened up as shown in Figures 1 and 3 of the drawings.

Figure 1:
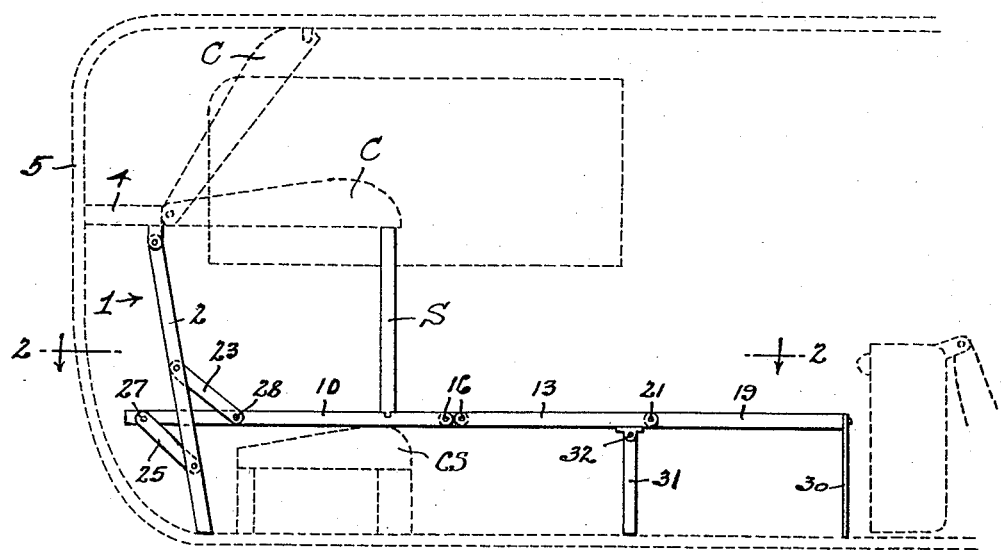
Figure 1 is a side elevation of a folding bed as used in an automobile of the brougham type, in which the front seats are adapted to be folded toward the dashboard.
Figure 2:
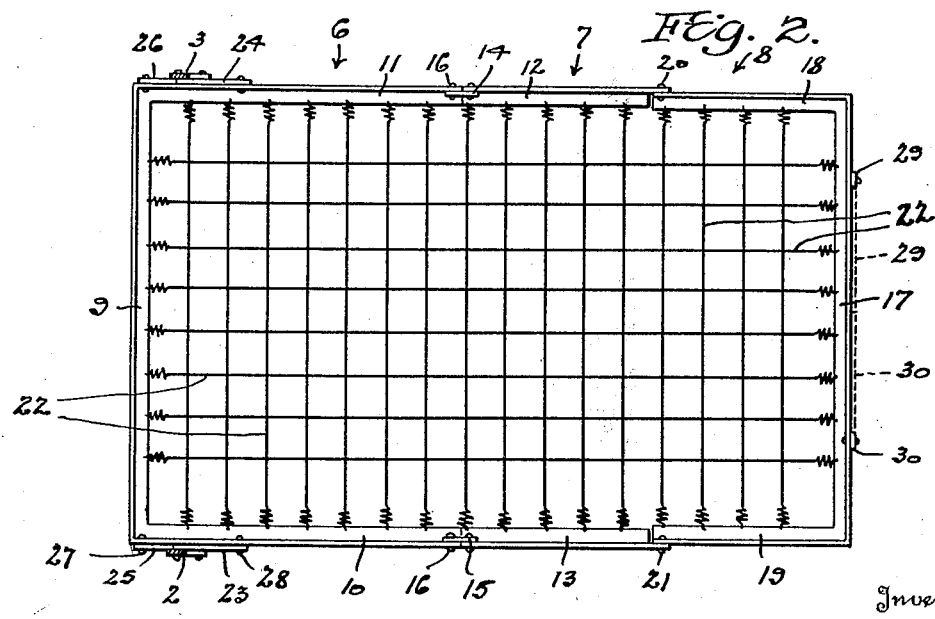
Figure 2 is a horizontal section taken on the line 2—2 of Figure 1.

As shown in the drawings, the invention is particularly adapted for use in an automobile of the brougham type in which the front seats may be folded forwardly toward the dashboard thereby providing additional room for the layout of the folding bed. As shown particularly in Figure 1 of the drawings, the frame work of the folding bed is pivotally supported by a swinging frame 1 having leg 2 pivoted at its upper end to a transverse shelf 4 which is suitably secured at its rear edge and ends to the back and side walls of the body of the automobile and immediately below the lower edge of the rear window 5. This shelf 4 is ordinarily found in automobiles of this type. In automobiles not so provided, the shelf can very easily be arranged therein in order to provide the space necessary to accommodate the bed when folded.

The mattress frame of the bed is made up of three sections 6, 7 and 8. The section 6 is formed of angle iron in which the end 9 is integrally connected to the sides 10 and 11 arranged at right angles to the end 9. The section 7 comprises two short bars 12 and 13 of angle iron pivoted to the ends of the sides 10 and 11, respectively, by pivot plates 14 and 15 suitably secured to swing freely about the flanges of the angle irons 10, 11, 12 and 13 by means of the usual pivot type rivets or bolts 16. The plates 14 are of course necessary to permit the folding of the sides 12 and 13 so that the edges of the flanges will lie directly over and be supported by the flanges of the sides 10 and 11 when the parts are folded, as shown in Figure 6 of the drawings.

The third section 8 of the folding bed comprises the end 17 having integrally connected thereto the side members 18 and 19. The distance between the outer faces of the sides 18 and 19 is equal to the distance between the inner faces of the sides 12 and 13 and 10 and 11. The sides 18 and 19 are connected by pivots 20 and 21 to the intermediate sides 12 and 13; and the length of the sides 18 and 19 is somewhat less than the length of the sides 12 and 13 so that the section 8 when nested between the sides 12 and 13 will permit the further and last folding of the section 8 and sides 12 and 13 over the sides 10 and 11. It will be understood that a thin mattress of the type in common use for automobile beds will be secured to the wires 22 of the springs secured to the frame work just described.

These thin mattresses ordinarily do not extend above the side flanges of the frame work and do not interfere with the ready folding of the bed whenever it becomes necessary. Where the mattresses are of any substantial thickness as would be the case in folding beds adapted for use in homes and apartments, the center section may be made equal to the double thickness of the mattress and the outer section may be folded over the inner section with the center section standing perpendicularly to both sections. This, however, is a matter for the mechanic and can be readily devised in accordance with the thickness of the mattress desired. For automobile use, the thickness of the mattress need not be considered and the frame work may be constructed as described and shown herein.

The inner section 6 of the bed extends between the sides 2 and 3 of the swinging frame and is supported by a pair of links 23 and 24. These links 23 and 24 have one end pivoted to the side flanges of the sides 10 and 11, respectively, and have their other ends pivoted to the sides 2 and 3 of the swinging frame 1.

A second pair of links 25 and 26 have their outer ends pivotally connected to the rear ends of the sides 10 and 11 and have their other ends pivotally connected to the sides 2 and 3 of the swinging frame 1. This arrangement of links supports the rear end of the bent frame rigidly when the parts are arranged as shown in Figure 1 of the drawings, but permits the bed when folded not only to swing rearwardly between the sides 2 and 3 of the frame 1 but also to swing downwardly so that it may occupy the least space possible in the vertical direction and at the same time permit the back cushion C to swing from the open position shown in Figure 1 to the closed position shown in Figure 7 of the drawings.

It will be understood that, preferably, the cushion C is detachably hinged to the shelf 4 and may be raised or lowered about this hinge connection to give access to the folding bed arranged beneath the shelf 4. The cushion C may be supported horizontally as indicated in Figure 1 of the drawings by means of a strut S placed between the bottom of the cushion and the frame work of the open bed; or any other suitable means may be used for this purpose.

When the bed is opened fully, as shown in Figure 1 of the drawings, its outer end is intended to be supported by a pair of standards 29 and 30 pivoted to the flange of the end 17 so as to be swung laterally until they lie folded between the edges of the end 17. A pair of intermediate supports may be pivoted to the horizontal flanges of the angle irons 12 and 13. One of these supports 31 is shown in Figure 1 of the drawings, as pivotally connected to the side 13 by means of the pivot bracket 32. A similar support 33 is connected to the side 12. This support does not appear in Figure 1 of the drawings but is shown in Figure 6 in folded position over the side 12, which is also shown folded.

It will be obvious from the drawings that I have devised a very compact form of folding bed which can be very readily secured behind the cushions of the rear seats of automobiles of the brougham type, either with the construction of the automobile as they stand or with some very slight alteration of setting forward the cushion to accommodate the shelf 4 necessary to provide the space for the bed in folded position.

The back cushion C when raised can obviously be utilized as a bed for children or as a shelf for holding luggage or other matter.

It will be evident from Figures 1, 3 and 5 of the drawings in this case that the section 6 is pivoted to the links 23 and 25 which, in turn, are pivoted to the sides 2 and 3 of the frame 1 so as to prevent contact of the bed frame with the cushions CS constituting the rear seat of the automobile. In other words, the invention mainly resides in the idea of supporting a folding bed behind the rear seat of an automobile in such manner that when extending that it can not possibly injure any of the cushions thereof; and, when folded, may be completely concealed behind the back cushion so as not to detract from the appearance of the interior of the automobile as a whole; and so as not to weaken the structure thereof in anyway.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A vehicle having an end wall, a shelf extending substantially horizontally across said wall, a seat spaced from said wall, a frame pivoted to said shelf to swing in the space between the rear edge of the seat and said wall, and a folding bed pivoted to and supported wholly by said frame when folded.

2. A vehicle having an end wall, a shelf extending substantially horizontally across said wall, a seat spaced from said wall, a frame pivoted to said shelf to swing in the space between the rear edge of the seat and said wall, a folding bed pivoted to and supported wholly by said frame when folded, and means for closing the opening between said seat and the edge of said shelf.

3. A vehicle having an end wall, a shelf extending substantially horizontally across said wall, a seat spaced from said wall and having its rear edge substantially parallel to the wall, a frame pivoted to said shelf to swing in the space between said rear edge and rear wall, a folding bed pivoted within said frame when folded, and extending over the top of said seat when unfolded, and a back detachably connected to said shelf to close the space between the shelf and seat.

4. A vehicle having an end wall, a shelf extending substantially horizontally across said wall, a seat spaced from said wall and having a rear edge thereof substantially parallel to said wall, a frame pivoted to said shelf to swing in the space between the said rear edge and rear wall, a folding bed comprising frame work extending between the sides of said swinging frame, two pairs of links pivotally connected to said swinging frame and to said frame work to support the frame work above said seat when the bed is in open position and to support said frame work wholly behind the seat when the bed is in folded position.

5. A vehicle having an end wall, a shelf extending substantially horizontally across said wall, a seat spaced from said wall and having a rear edge thereof substantially parallel to said wall, a frame pivoted to said shelf to swing in the space between the said rear edge and rear wall, a folding bed comprising frame work extending between the sides of said swinging frame, two pairs of links pivotally connected to said swinging frame and to said frame work to support the frame work above said seat when the bed is in open position and to support said frame work wholly behind said seat when the bed is in folded position, and means for closing the space between said shelf and said seat when the bed is in folded position on the swinging frame.

6. A substantially horizontal support, a frame pivoted to said support about a substantially horizontal axis, a folding bed frame positioned between the sides of the pivoted frame, a linkage connecting the bed frame to the swinging frame and standards pivoted to the bed frame to co-operate with said linkage in holding the bed frame horizontal when extended in open position.

7. A vehicle having an end wall, a seat spaced from said wall, side frame members pivoted with respect to the wall behind the seat and positioned substantially vertically one on each side and between the wall and seat, a folding bed, links pivotally connecting the bed with said frame members whereby said bed when folded is positioned between said frame members.

In testimony whereof I affix my signature.
GILLIS A. DAIGLE.